United States Patent
Sama et al.

(10) Patent No.: US 10,963,276 B2
(45) Date of Patent: Mar. 30, 2021

(54) DEVICE AND METHOD FOR CONTROLLING AN IP NETWORK CORE

(71) Applicant: Orange, Paris (FR)

(72) Inventors: Malla Reddy Sama, Rennes (FR); Lucian Suciu, Cesson-Sévigné (FR); Amin Aflatoonian, Rennes (FR); Karine Guillouard, Chantepie (FR)

(73) Assignee: ORANGE, Paris (FR)

( * ) Notice: Subject to any disclaimer, the term of this patent is extended or adjusted under 35 U.S.C. 154(b) by 703 days.

(21) Appl. No.: 15/508,883

(22) PCT Filed: Aug. 31, 2015

(86) PCT No.: PCT/FR2015/052301
§ 371 (c)(1),
(2) Date: Mar. 3, 2017

(87) PCT Pub. No.: WO2016/034798
PCT Pub. Date: Mar. 10, 2016

(65) Prior Publication Data
US 2017/0199751 A1    Jul. 13, 2017

(30) Foreign Application Priority Data

Sep. 3, 2014  (FR) ...................................... 1458246

(51) Int. Cl.
| | |
|---|---|
| *G06F 9/455* | (2018.01) |
| *H04L 29/06* | (2006.01) |
| *H04W 76/12* | (2018.01) |
| *H04L 12/28* | (2006.01) |
| *H04L 12/46* | (2006.01) |
| *H04L 12/24* | (2006.01) |

(Continued)

(52) U.S. Cl.
CPC ........ *G06F 9/45533* (2013.01); *H04L 12/287* (2013.01); *H04L 12/4633* (2013.01);
(Continued)

(58) Field of Classification Search
CPC . G06F 9/45533; H04L 69/161; H04L 12/287; H04L 12/4633; H04L 12/4641;
(Continued)

(56) References Cited

U.S. PATENT DOCUMENTS

| | | | | |
|---|---|---|---|---|
| 2008/0320041 | A1* | 12/2008 | Engelsma | ............... A63F 13/02 |
| 2012/0192178 | A1* | 7/2012 | Brownlow | .......... G06F 9/45558 |
| | | | | 718/1 |

(Continued)

OTHER PUBLICATIONS

International Search Report dated Oct. 14, 2015 for International Application No. PCT/FR2015/052301 filed Aug. 31, 2015, 5 pages.

(Continued)

*Primary Examiner* — Lewis A Bullock, Jr.
*Assistant Examiner* — Kevin X Lu
(74) *Attorney, Agent, or Firm* — Knobbe, Martens, Olson & Bear, LLP

(57) ABSTRACT

A control device can be used to control a base station, a switch, and a gateway leading to an external network. The device may communicate with a connection server connecting to a cloud computer system and with virtual functions of a control plane of the core network as instantiated in the computer system. The device may manage a database identifying for at least one terminal at least one of the virtual functions allocated to that terminal and a database associating at least one of the virtual functions with an identifier and a state of that function, and update the databases on the basis of information received from the connection server and/or from the virtual functions. The device may use one and/or the other of the databases in order to set up and/or maintain a user plane for a terminal between the base station, the switch, and the interconnection gateway.

15 Claims, 7 Drawing Sheets

(51) Int. Cl.
  *H04L 12/911*     (2013.01)
  *H04W 40/24*      (2009.01)
(52) U.S. Cl.
  CPC .... *H04L 12/4641* (2013.01); *H04L 29/06102* (2013.01); *H04L 41/0213* (2013.01); *H04L 47/781* (2013.01); *H04L 69/161* (2013.01); *H04W 40/24* (2013.01); *H04W 76/12* (2018.02)
(58) Field of Classification Search
  CPC ........... H04L 29/06102; H04L 41/0213; H04L 47/781; G04W 76/12; H04W 40/24
  See application file for complete search history.

(56) References Cited

U.S. PATENT DOCUMENTS

| | | |
|---|---|---|
| 2012/0281708 A1 | 11/2012 | Chauhan et al. |
| 2013/0142201 A1 | 6/2013 | Kim et al. |
| 2013/0283364 A1 | 10/2013 | Chang et al. |
| 2014/0185627 A1* | 7/2014 | Ditya |
| 2014/0241247 A1* | 8/2014 | Kempf ................ H04L 12/4633 370/328 |
| 2015/0040121 A1* | 2/2015 | Barabash ............ H04L 41/5003 718/1 |
| 2015/0237171 A1* | 8/2015 | Li .......................... H04L 67/16 709/217 |
| 2016/0323782 A1* | 11/2016 | Baillargeon ........ H04L 12/4633 |
| 2017/0300352 A1* | 10/2017 | Lou ..................... G06F 9/45558 |
| 2018/0123943 A1* | 5/2018 | Lee ....................... H04L 45/021 |

OTHER PUBLICATIONS

Written Opinion dated Oct. 14, 2015 for International Application No. PCT/FR2015/052301 filed Aug. 31, 2015, 5 pages.

Communication pursuant to Article 94(3) EPC issued by the EPO dated Mar. 10, 2020, in European Patent Application No. 15770562.5.

* cited by examiner

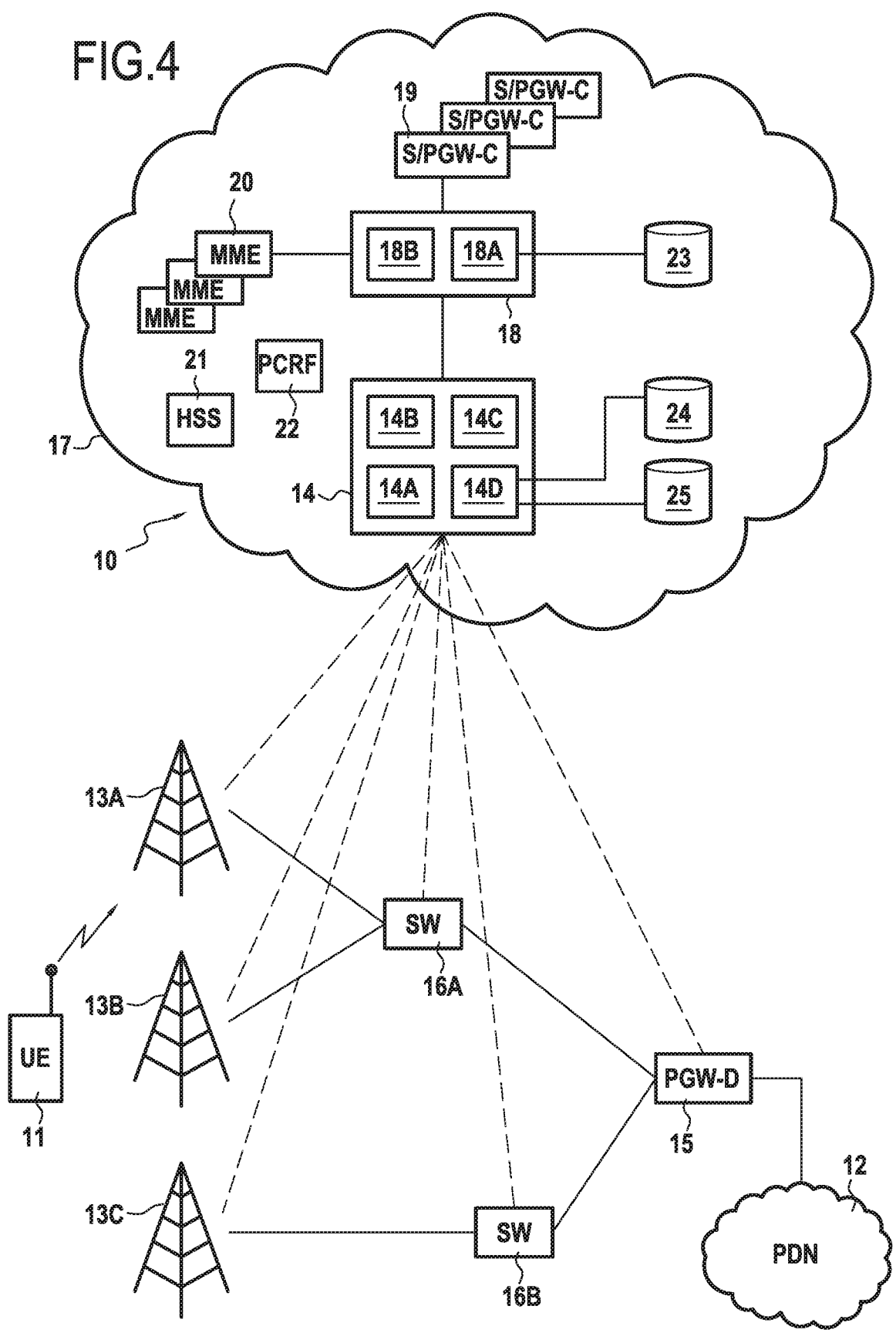

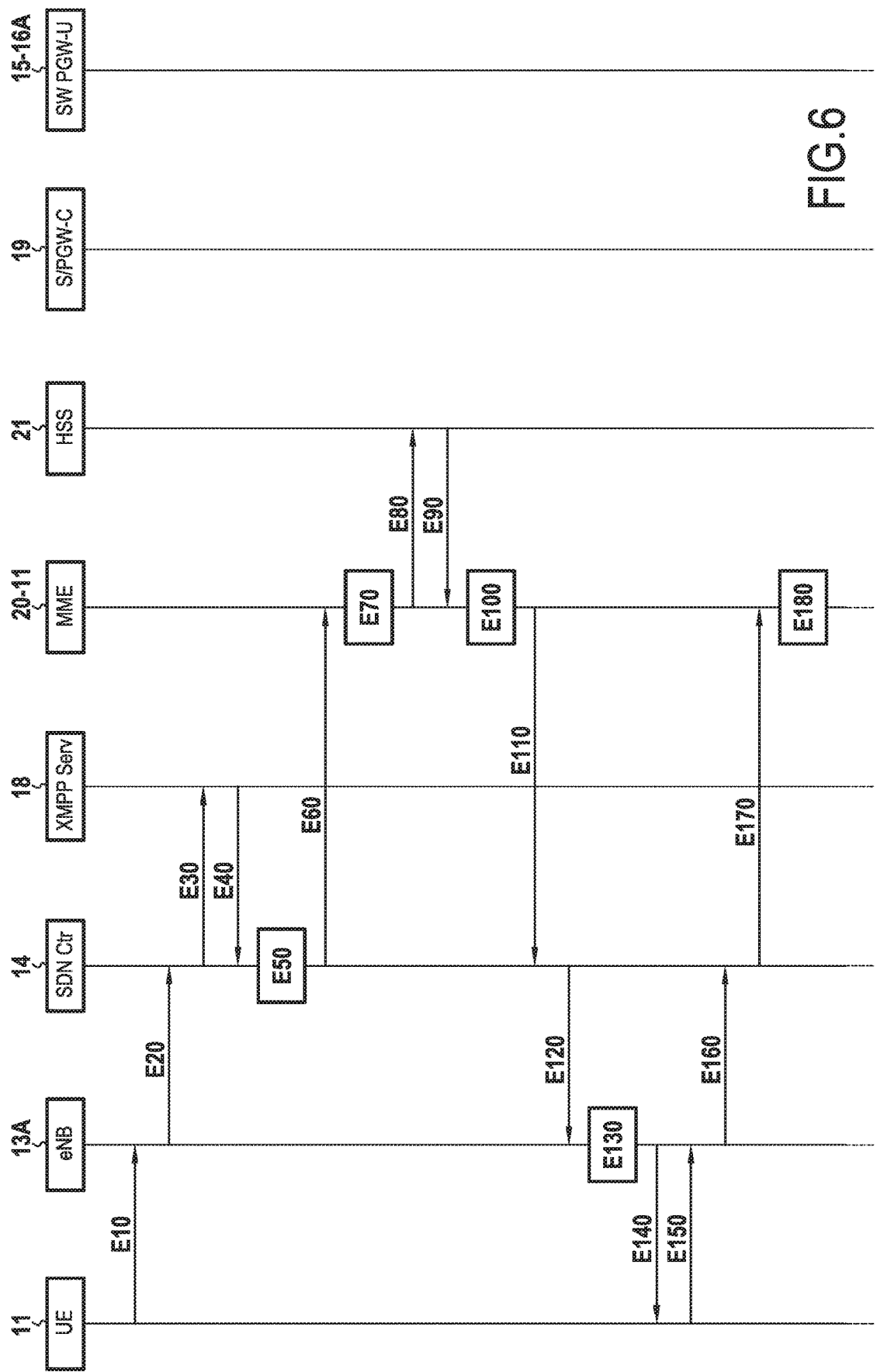

DEVICE AND METHOD FOR CONTROLLING AN IP NETWORK CORE

RELATED APPLICATIONS

This application is the U.S. National Phase of Application No. PCT/FR2015/052301 entitled "DEVICE AND METHOD FOR CONTROLLING AN IP NETWORK CORE" filed Aug. 31, 2015, which designated the United States, and which claims the benefit of French Application No. 1458246 filed Sep. 3, 2014.

BACKGROUND OF THE INVENTION

The invention relates to the general field of telecommunications. It relates more particularly to an architecture for an Internet protocol (IP) core network. The invention thus applies in preferred but non-limiting manner to communications networks complying with the long term evolution (LTE) standard as defined by the third generation partnership project (3GPP) standardization consortium, and more specifically to the architecture of an LTE/EPC core network (where EPC is short for evolved packet core).

Mobile telecommunications traffic is expected to increase exponentially in the coming years, driven by the appearance of new applications, new terminals, and communication at ever-higher data rates, and also by new players in the field of mobile telecommunications, such as mobile virtual network operators (MVNOs). In known manner, such MVNOs generally have their own core networks, thus enabling them to develop and propose their own applications to users, while relying on the access networks of traditional operators.

In this context, the LTE/EPC architecture has been defined by the 3GPP consortium to provide transparent IP connectivity between a user terminal, also known as user equipment (UE), and packet data networks (PDNs) suitable for providing the terminal with various communication services, such as voice over IP (VoIP), downloading data, video on demand, etc.

This architecture is based on:
an evolved universal terrestrial radio access network (E-UTRAN), which is connected to the user terminal via a base station known as an "eNodeB" (eNB); and
an IP core network (or EPC) managing data exchanges for uplinks and downlinks between the terminal and packet data networks connected to the core network.

FIG. 1 is a diagram showing the various pieces of network equipment relied on by the LTE/EPC architecture as presently defined by the 3GPP consortium, and as described in particular in the 3GPP document TS 23.401 entitled "Technical specification group services and system aspects: general packet radio service (GPRS) enhancements for evolved universal terrestrial radio access network (E-UTRAN) access", Release 12, March 2013. By way of indication, the planned exchanges between these pieces of equipment for transferring data (i.e. in the data plane or user plane) are represented by continuous lines, whereas the planned exchanges between these pieces of equipment for signalling to make these data transfers possible (i.e. in the control or signalling plane) are represented by discontinuous lines.

More precisely, in FIG. 1, the EPC core network 1 enables a UE user terminal 2 that is attached to (i.e. served by) an eNB base station 3A of an access network such as a mobile telecommunications network to access services made available by an external packet data network (PDN) 4.

To this end, the EPC core network 1 has four types of equipment, namely:
a data transfer gateway 5 also known as a serving gateway (SGW) that is situated between the access network and the core network 1;
an interconnection gateway 6 also known as a PDN gateway (PGW) enabling the core network 1 to be connected to the external packet data network 4;
equipment 7 for managing terminal mobility, also known as mobility management entity (MME) equipment, for ensuring IP connectivity of terminals when they are in a mobility situation; and
a user database 8 also know as a home subscriber server (HSS).

The base stations 3A and 3B are connected directly to the MME equipment 7 and to the SGW data transfer gateway (SGW) 5 via respective interfaces S1-MME and S1-U.

The MME equipment 7 manages the mobility and the IP network connectivity of the terminal 2. It is responsible for authenticating the terminal (in order to authorize it to access the core network 1), and it manages setting up communication sessions for this terminal and also intra-3GPP mobility.

The SGW and PGW gateways 5 and 6 are responsible for transferring data within the core network 1, for managing mobility, and for controlling quality of service in the data plane.

The MME equipment 7 is connected to the SGW data transfer gateway 5 via a logic interface S11. The SGW data transfer gateway 5 is connected to the PGW interconnection gateway 6 via an interface S5.

According to the current definition of the LTE/EPC architecture, the management of terminal mobility within the network relies on the GPRS tunneling protocol (GTP). This protocol comprises several components, including:
the GTP-U protocol used for transferring (exchanging) user data between two separate communication tunnels, so as to manage mobility situations of the user terminal on the interfaces S1 and S5; and
the GTP-C protocol used for setting up, updating, and maintaining GTP communication tunnels. The signalling exchanges on the interfaces S11 and S5 thus rely on the GTP-C protocol.

Distinct GTP communication tunnels are set up for different types of traffic exchanges within the network (i.e. for each quality of service), and more specifically, for each packet data protocol (PDP) communication session managed by the core network. The GTP communication protocol thus contributes not only to managing the mobility of terminals, but also to managing quality of service in the network.

As currently defined by the 3GPP consortium, the LTE/EPC architecture is not really optimized and makes it difficult for operators to integrate new services in IP core networks, regardless of whether those operators are traditional operators or operators of the MVNO type.

Specifically, the large amount of signalling that is induced by using the GTP protocol for managing the mobility of terminals and the quality of service in the network, the PGW gateways providing interconnection with the external packet networks, the SGW gateways for transferring data, and the MME equipment for managing mobility are all provided on specialized pieces of hardware equipment that are designed specifically to satisfy the demand of operators. Such equipment is thus particularly expensive and difficult to manage. It is inflexible and needs to be provisioned and configured in static manner.

This choice of implementation provides little flexibility in terms of reusing and/or reorganizing resources, in particular in the event of incidents affecting the network (e.g. such as network congestion). The network is designed to have capacity for accommodating the load on the network during peak periods, and in order to increase the capacity of the network, it is necessary to deploy new hardware on specific sites of the network. It is thus particularly expensive, time consuming, and laborious to maintain and run such a network that is configured in static manner.

It can thus be seen clearly that the present LTE/EPC architecture is limited with respect to mobile telecommunication operators integrating new services.

The document by J. Kempf et al. entitled "Moving the mobile evolved packet core to the cloud", $5^{th}$ International Workshop on Selected Topics in Mobile and Wireless Computing, 2012, proposes evolving the architecture of the LTE/EPC core network as defined by the 3GPP consortium and in which the data and control planes are separate, by making use of the principle of software-defined networking (SDN).

In known manner, an SDN network architecture makes it possible to decouple the control and data planes by centralizing the intelligence of the network (i.e. the control functions of the network) in a software control device. The behaviors of the pieces of network equipment are then defined by rules received from the control device, such as rules for processing or transferring data (i.e. traffic). The SDN concept relies on the OpenFlow™ communication protocol as defined by the open networking foundation (ONF) which makes it possible for pieces of network equipment to be programmed in simplified manner via a standard interface.

More specifically, the document by J. Kempf et al. proposes transferring the present functions of the MME equipment and also the control plane for the SGW data transfer gateways and the PGW interconnection gateway to applications that are executed above a control device implemented by a virtual machine located in an external data center. Such an external data center is also known as the "cloud". Applications interact with the software control device via application programming interfaces (APIs). The pieces of equipment in the data plane of the transfer gateways and of the interconnection gateway are replaced by OpenFlow™ switches. The control device is responsible for setting up the data plane.

Nevertheless, that proposal still relies on the same interfaces between the control entities of the network as defined by the 3GPP consortium and as mentioned above (typically the S1, S11, and S5 interfaces using the GTP protocol). Those interfaces rely on procedures that can become complex (e.g. restoration procedure) in particular in the event of malfunction being detected in a piece of equipment of the data plane, such as for example overloading or failure of an SGW transfer gateway, and that can not always be transparent for users, thereby leading to a degradation of user experience.

In similar manner, the architecture proposed by J. Kempf et al. does not make it easy to manage a failure or an overload of a function in the control plane of the core network, such as for example the MME function.

Consequently, although the solution proposed by J. Kempf et al. makes it possible to simplify the maintenance and configuration of core network equipment, it does not make it possible to provide users with an experience of quality that matches their needs and that satisfies the growing demand from operators to be able to integrate new services easily.

Patent application US 2014/0241247, having the above-mentioned author as one of its inventors, describes an architecture similar to that of the above-mentioned article, in which virtual functions communicate directly with an Open-Flow controller without having recourse to an intermediate connection server, and without having recourse to using databases for identifying virtual functions allocated to the terminals, and also their states, from such a connection server.

OBJECT AND SUMMARY OF THE INVENTION

The invention offers a solution to this problem in particular by proposing an IP core network control device suitable for controlling a base station of an access network, a switch of the IP core network, and an interconnection gateway connecting the IP core network to an external packet data network, the control device comprising:
  a communication module, configured to communicate with a connection server connecting to a cloud computer system and, via the server, with a plurality of virtual functions of a control plane of the IP core network that are instantiated in the cloud computer system;
  a management module for managing:
    a first database identifying for at least one user terminal managed by the IP core network and served by the base station at least one of the virtual functions allocated to the terminal; and
    a second database associating at least one of the virtual functions with a connection server identifier of that function and with a state of that function;
  the management module being configured to update the first and/or second database on the basis of information received by the communication module from the connection server and/or from the virtual functions; and
  a command module configured to use data of the databases to set up and/or maintain, for a terminal managed by the IP core network, a user plane between the base station, the switch, and the interconnection gateway.

Correspondingly, the invention also provides a control method for controlling an IP core network, the method comprising:
  a step of receiving information coming from a connection server connecting to a cloud computer system, and/or, coming from at least one virtual function of a control plane of the IP core network, which function is instantiated in the cloud computer system via the connection server;
  a management step of managing:
    a first database identifying for at least one user terminal managed by the IP core network and served by the base station at least one of the virtual functions allocated to the terminal; and/or
    a second database associating at least one of the virtual functions with a connection server identifier of that function and with a state of that function;
  the management step including updating the first and/or second database from said received information; and
  a step of setting up and/or maintaining, for a terminal managed by the IP core network, a user plane between a base station of an access network serving the terminal, a switch of the IP core network, and an interconnection gateway of the IP core network for connection to an external packet data network by using data from the first and/or second database.

The invention thus relies on SDN principles for the network defined by software in order to decouple the user (or data) plane from the control (or signalling) plane in the IP core network. This results in a novel IP core network architecture that is programmable, enabling the user plane and the control plane to be (re)configured dynamically.

More precisely, the invention proposes using a control device, e.g. a software device for setting up and controlling a relatively simple user plane on the basis of interconnection gateways of the IP core network connecting with external packet data networks, switches deployed in the IP core network (and operating at the layer 2 level of the open systems interconnection (OSI) model), and access network base stations connected to the switches. The access network base stations, the switches, and the interconnection gateways are connected directly to the control device, thereby facilitating its exercise of control.

In a particular implementation, the control method comprises a control step for controlling the base station and/or the switch and/or the interconnection gateway, this control step comprising transmitting to the base station and/or to the switch and/or to the interconnection gateway at least one processing rule for processing a data stream relating to the terminal, said at least one processing rule being defined on the basis of the data from the first and/or second databases and being for application while transferring data in the user plane.

In other words, the control exercised by the control device on the pieces of network equipment in the user plane gives rise in particular to transmitting processing and routing rules concerning the data streams relating to the terminals managed by the IP core network (i.e. going to or coming from those terminals), these processing rules being for application by the pieces of network equipment that are controlled by the control device (i.e. switches, base stations, and interconnection gateways). They are defined by the control device on the basis of information stored in the first and second databases, and on the basis of its interactions with the functions of the control plane of the IP core network.

By way of example, the functions of the control plane of the IP core network comprise:
at least one function for managing the mobility of terminals in the IP core network; and/or
at least one function for controlling the interconnection gateway and/or the switch. It should be observed that it may be a single function that manages both an interconnection gateway and switches connected to the gateway, or distinct functions for the interconnection gateway and for the switches.

Advantageously, these functions of the control plane are virtual functions instantiated in a cloud computer system, e.g. on distinct virtual machines, thus making it easy in real time to adapt their numbers, their configurations, and/or also their capacities, as a function of the needs of the operator of the IP core network and of the terminals managed thereby. In particular, by means of the invention, it is possible to instantiate a plurality of control functions of the same type, e.g. a plurality of functions for managing terminal mobility, with the management and the provisioning of these functions being facilitated by the databases maintained by the control device.

These control functions communicate with the control device via a connection server providing connection with the cloud computer system that keeps the control device informed about the states of these functions, in particular in terms of availability and/or load. The connection server makes it easy to provision new functions in the cloud computer system when necessary. This availability and state information supplied by the connection server is stored by the control device in the second database in association with an identifier for each function of the control plane that is instantiated in the cloud computer system. This information is in addition to the information stored in the first database enabling the control device to identify easily the functions of the control plane allocated to a terminal, so as to be able to set up and maintain a user plane (including adapting the user plane, where necessary) in simple and effective manner for transferring data streams for the terminal.

By way of example, the connection server that acts as an intermediary between the control device and the virtual functions of the control plane that are instantiated in the cloud computer system may be a server having the control device and the virtual functions as clients, with which it communicates by using the extensible messaging and presence protocol (XMPP) communication protocol.

Such a server also makes it possible to secure access to the IP core network by opening such access only to applications or virtual functions that are authorized and authenticated.

The invention also provides a connection server connecting to a cloud computer system, the server comprising:
a management module for managing a database associating at least one client of the connection server with a connection server identifier for that client and with a client state, said at least one client comprising at least one virtual function of a control plane of an IP core network, which function is instantiated in the cloud computer system, and an IP core network control device of the invention; and
a communication module suitable for communicating with said at least one virtual function and with the control device, and configured to transmit to the control device information extracted from the database relating to said at least one virtual function.

The capabilities of such a server (and in particular the client database that it manages), and its interactions with the control device and the virtual functions of the control plane of the IP core network enable the control device to monitor the state of those functions in real time and to act in real time to adapt the topology of the control plane of the IP core network as a function of those states.

Thus, by way of example, if a terminal mobility management function (or MME function) is overloaded, the control device is informed by the connection server and can act appropriately. In particular, it can select a new virtual control function instantiated in the cloud computer system, or it can request that a new virtual function be instantiated in the cloud computer system, or indeed it can balance traffic between the virtual mobility management functions that are already instantiated.

The action of the connection server in such a situation may be:
reactive, informing the control device of the current overload state of the mobility management function so as to enable it to envisage appropriate action; or
proactive, providing the control device with a list of mobility management functions that are available.

This leads to flexibility in managing the core network and to an improvement in the reliability of IP connectivity made available by the core network to terminals. User experience is thus enhanced.

The invention thus applies in preferred manner to an LTE/EPC core network architecture. In such a context, and unlike the state of the art described in the document by J. Kempf et al., the architecture proposed by the invention offers interfaces between the pieces of network equipment on which the user plane relies and the functions of the control plane of the IP core network other than the interfaces that are presently defined in the LTE standard. More specifically, the invention proposes replacing the communication protocols specified for the S1-MME communication interface (between eNodeB base stations and the mobility management entity (MME) of the core network), the S5 communication interface (between the SGW data transfer gateways and the interconnection gateways PGW of the IP core network connecting with external packet data networks), and S11 communication interface (between the mobility management entity and the SGW data transfer gateways). The novel architecture of the core network defined by the invention thus makes it possible to simplify some of the procedures defined by the standard. In particular, they enable the control device to update directly the base stations in the event of a switch failing.

In this way, the invention makes available to the terminals procedures that are more flexible and more transparent in terms of IP connectivity, without requiring excessive signalling.

In addition, and as mentioned above, the fact that the functions of the control plane are instantiated in a cloud computer system, and the management of these functions by the control device as made possible by keeping up to date the first and second databases of the control device and the client database of the connection server make it possible for these virtual functions to be provisioned depending on the needs of telecommunications operators.

In particular, this facilitates integrating new telecommunications operators, in particular virtual operators, by simplifying the control of the access made available thereto and their use of (possibly virtual) equipment of the traditional operator to which they are attached. The invention makes it possible not to be restricted to conventional sharing of the access network in the manner that is generally performed at present between traditional operators and virtual operators, but instead to envisage other ways of integrating virtual operators. By way of example, it is thus possible to allocate a distinct virtual function of the control plane to each virtual operator making use of the infrastructure of the traditional operator in question. The management and the activity of the virtual functions allocated respectively to a plurality of virtual operators are simplified by means of the client database maintained by the connection server.

In a particular embodiment, the control device of the invention further comprises an allocation module configured to allocate to the terminal managed by the IP core network at least one said virtual function instantiated in the cloud computer system as a function of information representative of a current availability state and/or a current load state of the virtual function, as transmitted by the connection server.

Correspondingly, the communication module is configured to transmit to the control device information representative of a current availability state and/or a current load state of at least one said virtual function identified in the database.

Also correspondingly, the control method further comprises a step of allocating one of said virtual functions of the control plane to the terminal as a function of information representative of a current availability state and/or a current load state of the function as transmitted by the connection server.

This current availability or current load state information can easily be obtained by the connection server, in particular when it is an XMPP server.

The allocation module of the control device (or the allocation step of the control method) serves to manage overload or failure situations of functions in the control plane that might affect the IP core network, and to do so in a manner that is effective and fast.

In addition, it also plays an important role when setting up the user plane carrying a communication session of a terminal, for allocating to the terminal functions of the control plane that are suitable for managing the communications of the terminal.

In another embodiment, the user first database of the control device further includes, for the terminal, at least one communication parameter for use in transferring data in the user plane set up by the command module.

For example, said at least one communication parameter comprises an address of the interconnection gateway, an address of the switch, and identifiers of endpoints of a communication tunnel set up in the user plane.

These communication parameters make it possible to set up a communication tunnel in the user plane between the base station and the interconnection gateway: by way of example, this communication tunnel may be a GTP tunnel. These communication parameters are centralized in the control device, which makes it possible for it to define easily the rules for processing data streams going to or coming from the terminal, with which it controls the pieces of network equipment defining the user plane set up for the terminal.

It should also be observed that the invention advantageously enables a single communication tunnel to be set up between the base station and the interconnection gateway providing connection with the external network. In contrast, in the state of the art as described by J. Kempf et al., as in the 3GPP standard, a first communication tunnel is established between the base station and the SGW data transfer gateway to which the base station is connected, and a second communication tunnel is established between the data transfer gateway and the interconnection gateway connected to the external network. Each time such a tunnel is set up (in compliance with the GTP protocol of the 3GPP standard), it is necessary to exchange various pieces of information and in particular tunnel identifiers, which thereby gives rise to a large amount of signalling and can become complex, in particular when procedures are used for restoring such tunnels. The invention thus makes it possible to limit the signalling that takes place in the IP core network.

In another aspect, the invention also provides:
a control device of the invention;
a connection server connecting to a cloud computer system of the invention; and
at least one virtual function of a control plane of the IP core network, which function is instantiated in the cloud computer system;
the control device and said at least one virtual function being clients of the connection server.

The IP core network benefits from the same advantages as those mentioned above for the control device and for the connection server.

In a particular embodiment, the various steps of the control method are determined by computer program instructions.

Consequently, the invention also provides a computer program on a data medium, the program being suitable for being performed in a control device or more generally in a computer, the program including instructions adapted to perform steps of a control method as described above.

The program may use any programming language, and be in the form of source code, object code, or code intermediate between source code and object code, such as in a partially compiled form, or in any other desirable form.

The invention also provides a computer readable data medium, including instructions of a computer program as mentioned above.

The data medium may be any entity capable of storing a program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other implementations and/or embodiments, it is also possible to envisage that the control method, the control device, the connection server, and the IP core network of the invention present in combination all or some of the above-mentioned characteristics.

BRIEF DESCRIPTION OF THE DRAWINGS

Other characteristics and advantages of the invention appear from the following description made with reference to the accompanying drawings, which show an embodiment having no limiting character. In the figures:

FIG. 4 shows, in its environment, a core network comprising a control device and a connection server in accordance with the invention in a particular embodiment;

FIG. 6 is depicted using seperate figure subsections labeled as FIG. 6A and FIG. 6B, respectively.

DETAILED DESCRIPTION OF THE INVENTION

As mentioned above, the invention proposes implementing a software-defined network (SDN) architecture within an IP core network, such as for example an LTE/EPC core network, so as to improve the flexibility and the reliability in terms of IP connectivity of the core network. This new architecture makes it possible to satisfy the needs of users and operators more effectively, to integrate new services more easily, and to open the network safely to third parties such as mobile virtual operators.

More precisely, the invention defines a new control plane (signalling) and a new user plane (data) in the IP core network, in which:

a centralized control device controls a plurality of interconnection gateways interconnecting the IP core network with external packet data networks and a plurality of switches (operating at level 2 of the open systems interconnection (OSI) model) connected to the gateways and to base stations of one or more access networks; and a plurality of functions of the control plane are instantiated on virtual machines of a cloud computer system and communicate with the control device via a server providing connection with the cloud computer system.

In the presently-described embodiment, the control device is a software control device that is programmable and that controls the interconnection gateways, the switches, and the base stations of the access network by using processing rules via the OpenFlow™ protocol. The OpenFlow™ protocol is described in particular in the document "OpenFlow switch specification, Version 1.3.1", September 2012.

The functions of the control plane, such as the MME functions for managing terminal mobility, the control functions for controlling the interconnection gateways and the switches, are transferred to virtual machines in a cloud computer system, with access thereto being governed by an XMPP connection server. Thus, in the presently-described embodiment, the control device communicates with the functions of the control plane by using the known XMPP protocol.

Because of this architecture and because of the decoupling of the user and control planes, it is very easy to position pieces of equipment in the user plane and to connect the corresponding control functions in the cloud computer system. This obtains greater flexibility than in the LTE/EPC architecture as currently proposed in the 3GPP standard.

Figure 1:
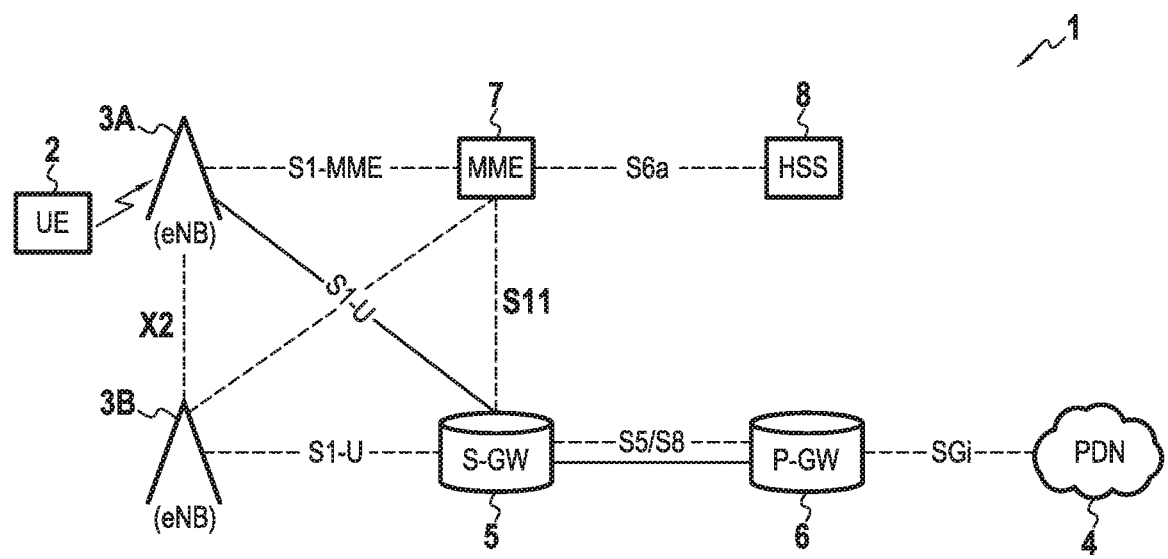
FIG. 1, described above, shows the architecture of an LTGE/EPC core network as proposed by the 3GPP consortium.
Figure 2:
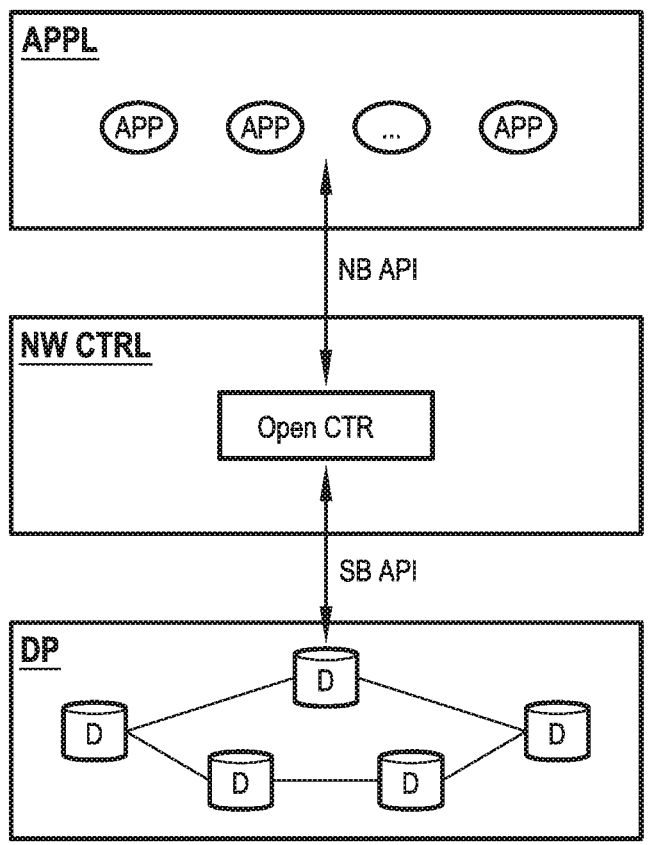
FIGS. 2 and 3 show the principles of a software-defined network (SDN)
Figure 3:
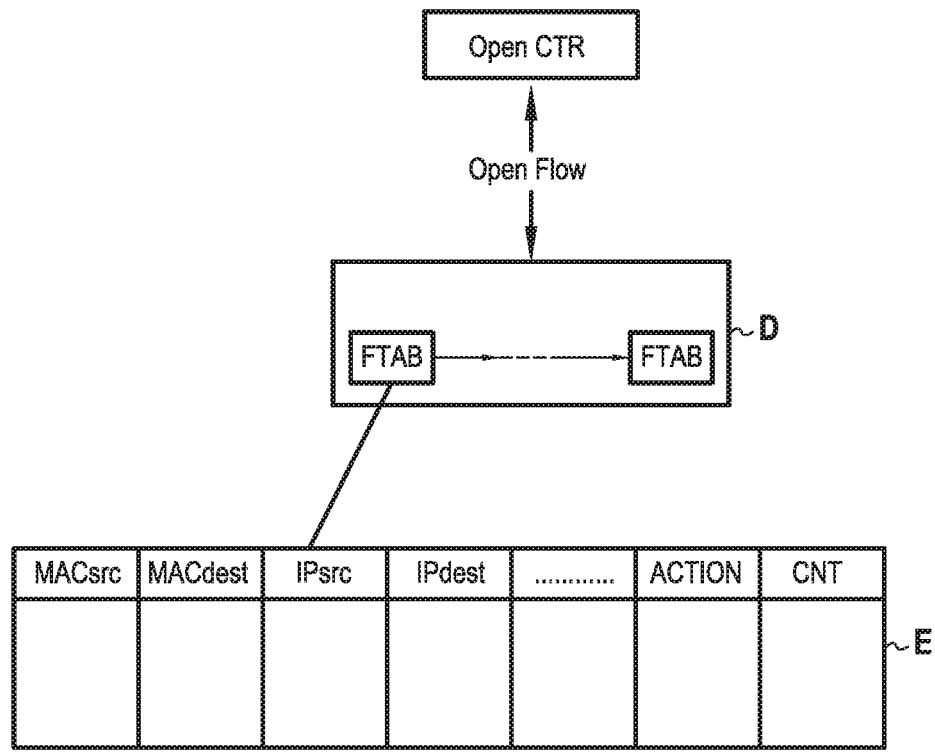

In order to facilitate understanding of the invention, the description begins with reference to FIGS. 2 and 3 by briefly recalling the general principles of an SDN architecture. Such an architecture is described in detail in the document published by the ONF and entitled "Software-defined networking: the new norm for networks", Apr. 13, 2012. In the example chosen to illustrate these principles, the SDN architecture relies on using the OpenFlow™ protocol.

As mentioned above, the SDN concept enables the behavior of pieces of network equipment to be specified by using high level control programs, thus making it easy to automate certain tasks, such as configuring the pieces of equipment of the network or managing policies (or services) that are applied at network level.

For this purpose, the SDN architecture centralizes the intelligence of the network (i.e. the functions of controlling the network and its pieces of equipment) in a software control device (or "controller"). The behavior of the pieces of network equipment in the presence of data relating to a terminal, or more precisely to a communication session, is thus defined by the control device by means of "processing" or "transfer" rules that are transmitted to those pieces of equipment. These rules are stored by the network equipment in "flow" tables and they are for application by each piece of equipment on receiving data packets or data streams. In particular, they specify the pieces of equipment of the network to which the data (i.e. the traffic) is to be transferred on uplinks and downlinks.

FIG. 2 summarizes this mode of operation by diagrammatically modeling an SDN architecture in three layers:

a bottom layer DP modeling the data plane and comprising pieces of network equipment D that are controlled by the control device (these pieces of equipment D may equally well be physical or virtual);

an intermediate layer NW CTRL modeling the software control device proper, given the reference "OpenCTR"; and a top layer APPL modeling various control functions or applications APP used by the control device OpenCTR to control the pieces of network equipment D in the data plane DP and to prepare the processing rules.

The various layers mentioned above communicate with one another via programming interfaces or APIs referred to as "NorthBound API" and "SouthBound API" (written respectively "NB API" and "SB API" in FIG. 2.

The programming interfaces SB API between the control device OpenCTR and the data plane in this example make use of the OpenFlow™ communication protocol.

In accordance with the invention, the user plane relies on interconnection gateways of the IP core network that connects with external networks, on switches connected to those gateways, and on base stations of one or more access networks that are connected to the switches. A programming interface SB API implementing the OpenFlow™ communication protocol is specifically provided in accordance with the invention between the control device OpenCTR and the base stations. In order to simplify the description below, the pieces of network equipment D controlled by the control device OpenCTR using the OpenFlow™ protocol include the interconnection gateways, the switches, and the base stations.

The programming interfaces NB API may use any open communication protocol. In the presently-described embodiment, they are based on the XMPP communication protocol as described in greater detail below.

As mentioned above and as shown in FIG. 3, the OpenFlow™ protocol enables the software control device OpenCTR to control each piece of network equipment D (interconnection gateways, switches, and base stations) easily by means of a set of data processing rules, including in particular data transfer (or routing) rules to be applied by the network equipment on receiving data relating to a communication session (in other words data exchanged during a communication session).

These processing rules are determined by the control device OpenCTR, e.g. as a function of the policy envisaged by the operator for managing the network. They specify the processing that is to be applied by each piece of equipment on receiving a packet of a data stream associated with a communication session of a terminal, and the following packets associated with the same stream.

In each piece of network equipment D, these processing rules are stored in the form of flow tables FTAB, having inputs that can easily be modified by the control device OpenCTR by using the OpenFlow™ protocol (e.g. adding, updating, deleting entries in the table).

By way of illustration, an entry E in such a flow table FTAB is shown in FIG. 3. It is in the form of a plurality of fields or parameters that are to be examined by the network equipment D on receiving a data packet in order to identify what processing is to be applied to the packet (e.g. to which piece of equipment of the core network or of the access network the packet is to be transferred).

By way of example, these fields include source and/or destination address fields such as medium access control (MAC) addresses MACsrc and MACdest, and/or IP addresses IPsrc and IPdest. One or more fields may be specified for each entry. The or each field specifies addresses that must be present in the packet header to which this entry E in the flow table relates. Each entry E of the table also specifies an ACTION field defining the processing to be applied to the packets corresponding to the entry E. Other fields may naturally also be defined for each entry of the table FTAB in addition to the above-specified fields, as shown in FIG. 4, such as for example a counter field (CNT), a field defining an input and/or output port, etc.

The network equipment D uses the flow tables FTAB as defined in this way as follows.

On receiving a data packet, it searches in the stored tables FTAB to see whether the specified field(s) MACsrc, PACdest, IPsrc, IPdest of an entry coincide(s) with the field(s) of the header of the packet.

Where applicable, the piece of network equipment D executes the instructions associated with the entry specified in the ACTION field on the data packet (e.g. transfers the packet to a determined piece of equipment of the network, or modifies or deletes the packet).

In contrast, if no entry coincides with the header of the received packet, the packet is transferred to the control device OpenCTR, which creates a new entry in the flow table together with the processing associated with that entry (in other words a new processing rule), and it transmits the entry to the piece of network equipment D for storing in a flow table.

The control and data planes within the SDN architecture are thus indeed decoupled.

With reference to FIGS. 4 to 7, there follows a description of how the invention advantageously proposes applying this principle to an IP core network architecture, and more particularly to an LTE/EPC core network architecture.

In order to simplify the description, when the description does not state otherwise, the operating functions and modes of the pieces of network equipment under consideration (in particular the base stations of eNodeB type, the mobile terminals of UE type, the home subscriber server (HSS), and the policy and charging rule function (PCRF) server, etc.) are similar or identical to the functions and modes described in the 3GPP document TS 23.401 published by the 3GPP, and they are not described in greater detail herein. Nevertheless, the invention is not limited solely to LTE telecommunications networks, and it is equally applicable to other core network architectures based on the IP protocol ("all IP networks"), such as, for example, a proprietary IP core network.

FIG. 4 shows a core network 10 in accordance with the invention in a particular embodiment in which the core network enables a UE terminal 11 to access services made available by an external packet data network (PDN) 12. This PDN network 12 may for example be the public Internet. For simplification purposes, consideration is given to a single network only.

It is assumed that in order to access these services, the UE terminal 11 is connected to a base station 13A (typically an eNodeB station) of an access network, e.g. such as a UMTS mobile telecommunications network. Nevertheless, no limitation is associated with the nature of the access network used by the UE terminal 11 providing it is compatible with the core network 10.

In accordance with the invention and with the above-summarized principles of SDN, the control and data planes are decoupled in the core network 10. This decoupling is provided by a control device 14 in accordance with the invention, using the operating principles of the control device OpenCTR as described above with reference to FIGS. 2 and 3.

The control device 14 controls various pieces of equipment of the core network 10 that act in the user plane, namely:
- one or more interconnection gateways 15 connecting with the external packet data network (PDN) 12; and
- a plurality of switches 16A, 16B, and 16C connected to the interconnection gateway 15 and operating at the level of layer 2 of the OSI model, each switch 16A, 16B, and 16C (referenced more generally as 16) being connected to one or more base stations of the access network, given general reference 13. Thus, in the example shown in FIG. 4, the switch 16A is connected to the base stations 13A and 13B, while the switch 16B is connected to the base station 13C.

In accordance with the invention, the control device 14 also controls the base stations 13 (13A, 13B, and 13C in FIG. 4) that are connected to the switches 16 of the IP core network 10.

Naturally, no limitation is associated with the number of switches connected to the interconnection gateway leading to the external network, nor with the numbers of base stations connected to the switches.

The control device 14 controls these various pieces of equipment of the network via a command module 14A. More precisely, it uses the command module 14A to set up a user plane for the data streams relating to a terminal managed by the core network 10 by defining processing rules that are to be applied by the interconnection gateway 15, by the switches 16, and by the base stations 13 to the data packets they receive over uplinks and downlinks and relating to the terminal. These processing rules are supplied by the control device 14 to the pieces of network equipment it controls by making use of the OpenFlow™ protocol.

The processing rules supplied by the control device 14 are stored in each piece of network equipment (i.e. switches 16, interconnection gateway 15, and base stations 13) in flow tables (not shown in FIG. 4), having entries that can be modified easily (e.g. adding, updating, deleting entries in the table) by the command module 14A using the OpenFlow™ protocol. These tables are similar or identical to the tables FTAB described above with reference to FIG. 3.

In this example, the processing rules used by the control device 14 for controlling the pieces of network equipment 13, 15, and 16 are rules for transferring IP data packets received by these pieces of equipment by identifying the piece of network equipment to which the packets are to be transferred as a function of various criteria satisfied by the headers of the packets (e.g. MAC or IP source or destination address, as shown in FIG. 3).

Thus, in a first example, for the interconnection gateway 15, one such processing rule identifies one of the switches 16A, 16B, and 16C to which a data packet (or more generally a data stream) is to be transferred as a function of fields present in its header when the packet is received on a downlink.

In a second example, for the switch 16A, such a processing rule identifies the interconnection gateway 15 to which an uplink packet is to be transferred, and the base station 13A or 13B of the access network to which a downlink data packet is to be transferred.

Finally, in a third example, for a base station 13A or 13B of the access network, such a processing rule serves to identify the switch 16A to which a packet received from a terminal served by the base station is to be transferred over an uplink.

The interconnection gateway 15, the switches 16, and the base station 13 are also suitable for calling on the control device 14 by means of an OpenFlow™ protocol message whenever they receive a data packet that does not correspond to any of the entries in their respective flow tables. On receiving such a message, the control device 14 uses its command module 14A to create an appropriate processing rule and it updates the flow tables of the pieces of network equipment in question.

In accordance with the invention, the control functions of the switches 16 and of the interconnection gateway 15 are separate from the data transfer functions performed by those pieces of equipment. In accordance with the principle of SDN, the control functions are executed above the software control device 14. More precisely, and in accordance with the invention, these functions defining the control plane of the IP core network 10 are virtual functions that are instantiated on virtual machines of a cloud computer system 17. These virtual functions communicate with the control device 14, and more specifically with a communications module 14B of the control device 14, via an XMPP connection server 18.

In order to better illustrate this separation of the user and control planes that is put into effect by the invention, the function combining the functions of controlling the interconnection gateway and the switches is referenced "S/PGW-C 19" in FIG. 4 and in the description. The pieces of equipment acting in the user plane to apply the data transfer functions of the switches and of the interconnection gateways are referenced respectively "SW" and "PGW-D".

It should be observed that in the presently-described embodiment, the control plane of the interconnection gateway 15 and of the switches 16 connected to the gateway is provided by a single virtual function S/PGW-C instantiated on a virtual machine. In contrast, and as shown in FIG. 4, it is possible to envisage it being provided by a plurality of distinct virtual functions suitable for controlling the interconnection gateway 15 and the switches 16 that are connected thereto.

In a variant, virtual functions that are distinct and/or instantiated on different virtual machines may be envisaged for controlling firstly the interconnection gateway 15 (virtual function PGW-C) and secondly the switches 16 that are connected thereto (virtual function SGW-C).

Via its interactions with the S/PGW-C virtual control functions 19, the control device 14 thus centralizes the network intelligence of the switches 16 and of the interconnection gateway 15, and it determines the processing rules to be applied to the data packets received by them and by the base stations 13. For this purpose, it relies on a set of control processes implemented in particular by virtual control functions instantiated in the cloud computer system 17, and by other modules of the control device 14, such as for example a network topology management module, a quality of service management module, a load balancing module, a module for managing routing in the network, etc., for performing functions that are themselves known. These modules are grouped together in the figure under the reference 14C and referred to as "command modules" in the description below, for simplification purposes. They serve in particular to guarantee certain specific attributes to users or to services managed by the IP core network, in particular in terms of security, mobility, application of policies determined by the operator, etc.

Other virtual functions may be instantiated in the cloud computer system 17 so as to perform conventional functions for the control plane of the IP core network. In this example these comprise in particular a plurality of virtual MME functions 20 for managing the mobility of terminals in the IP core network, a virtual HSS server function 21, and a virtual PCRF server function 22. It should be observed that the virtual MME functions 20 differ from the functions of MME entities as defined in the LTE standard in that they are not responsible for selecting the switches 16 and/or the interconnection gateway 15 defining the user plane associated with a terminal. As described in greater detail below, this selection is performed by the control device 14 itself, in particular by means of its control modules 14C.

In the presently-described embodiment, some of the virtual functions instantiated in the cloud computer system 17 communicate with one another via the interfaces described in the LTE standard. Thus, by way of example, the virtual MME functions 20 and the virtual HSS server function 21 communicate using an interface S6a as defined in the 3GPP document TS 29.272 entitled "Technical specification group core network and terminals; evolved packet system (EPS); mobility management entity (MME) and serving GPRS support node (SGSN) related interfaces based on diameter protocol", Release 12, v12.5.0, June 2014. In similar manner, the virtual PCRF server function 22 communicates with the virtual S/PGW-C functions 19 using a Gx interface as defined in the 3GPP document TS 29.210 entitled "Technical specification group core network and terminals; charging rule provisioning over Gx interface, version 6.7.0".

Other virtual functions instantiated in the cloud computer system 17 communicate with one another via the XMPP connection server 18 using the XMPP communication protocol.

More precisely, in this example, the virtual S/PGW-C control functions 19 and the virtual MME functions 20 for managing the mobility of terminals are clients of the XMPP connection server 18 as is the control device 14. In other words, this means that the virtual functions 19 and 20 and the control device 14 communicate with one another via a direct and dedicated communication channel set up by the XMPP server 18, and using the XMPP protocol over this channel. The XMPP server 18 communicates with the virtual functions 19 and 20 and with the control device 14 via a communication module 18B suitable for implementing the XMPP protocol, and in a well-known client server mode of communication (i.e. in the form of exchanging requests from clients and responses from the server to those requests).

The XMPP server 18 is a connection server connecting to the cloud computer system 17 in accordance with the invention. It is configured to authenticate its clients (in other words, in this example the virtual control functions 19 and 20 and the control device 14), and to refuse access to the cloud computer system 17 and to user services (clients) that are not authorized. Furthermore, by means of a database management module 18A, it maintains a client database 23 containing information about clients. The term "database" is used herein to mean any type of structure in which data is stored (e.g. a table, a vector, etc.).

Thus, in particular, the client database 23 in this example contains the following for each client of the XMPP server 18:
    a unique identifier identifying the client with the XMPP server 18: this identifier is usually referred to as a "Jabber ID" or indeed a "Jabber address"; and
    at least one state of the client. In the presently-described embodiment, the XMPP server 18 stores both a current availability state and a current load state of the client in question in the client database 23. These states are obtained by using the XMPP protocol implemented by the server 18 and in compliance with the conventional operation of an XMPP server.

In accordance with the invention, the XMPP server 18 is configured to act via its communication module 18B to transmit information (data) stored in the client database 23 to the control device 14 in order to enable it to set up and control a user plane for a terminal managed by the IP core network, and to process messages relating to that terminal as exchanged in the user plane.

This information enables the control device 14 to use a database management module 14D to keep up to date a control database 24 that includes, for each virtual MME function 20 and for each virtual S/PGW-C function 19, an identifier of that function with the XMPP server 18 (in this example the Jabber ID given uniquely to the function by the XMPP server 19), together with at least one state of that function. In the presently-described example, the database 24 contains a current availability state and a current load state for each virtual function 19 and 20.

In addition, in the presently-described embodiment, the database 24 also contains, for each virtual function identified in the database, the identifiers of the terminals managed by the IP core network 10 to which the function is allocated.

By means of its database management module 14D, the control device 14 also keeps up to date a user database 25 identifying, for at least one user terminal managed by the IP core network 10, the virtual functions allocated to the terminal from among the functions 19 and 20 that are instantiated in the cloud computer system 17.

In the presently-described embodiment, the user database 25 also includes, for at least one terminal identified in the database, one or more communication parameters for use when transferring data in a user plane set up for the terminal between a base station 13 serving the terminal and the interconnection gateway 15. In this example, these communication parameters include in particular an address of the switch 16 connected to the base station 13 serving the terminal, an address of the interconnection gateway 15, and identifiers of endpoints of a communication tunnel set up between the base station 13 and the gateway 16 for transferring data, these identifiers being allocated to the terminal by the base station 13 and by the virtual control function 19 of the interconnection gateway 16, respectively.

It should be observed that in accordance with the invention, the user plane set up in the control device 14 relies on switches 16 rather than on SGW type data transfer gateways as defined in the LTE/EPC architecture of the 3GPP standard. The use of switches operating at the layer 2 level of the open systems interconnection (OSI) model makes it possible to exchange IP data packets directly in the user plane between the base stations 13 and the switches 16, and also between the switches 16 and the interconnection gateway 15. The invention thus makes it possible to make do with setting up a single GTP communication tunnel between a base station 13 and an interconnection gateway 16, instead of two distinct GTP tunnels between the base station 13 and the switch 16 to which it is connected, and between the switch 16 and the interconnection gateway 15 to which the switch 16 is connected.

This single communication tunnel is defined (i.e. identified) by various communication parameters such as in particular the tunnel endpoint identifiers (TEIDs) and an Internet protocol (IP) address of the gateway 15, an IP address of the switch 16, and user datagram protocol (UDP)

port numbers for these pieces of equipment. By enabling a single communication tunnel to be set up between the base station 13 and the interconnection gateway 15, the invention achieves a saving in terms of signalling exchanged over the core network.

In the presently-described embodiment, the control device 14 and the XMPP server 18 are software entities, in other words computer programs or applications, that are executed on respective computer devices or computers 26 and 27.

Figures 5A, 5B:
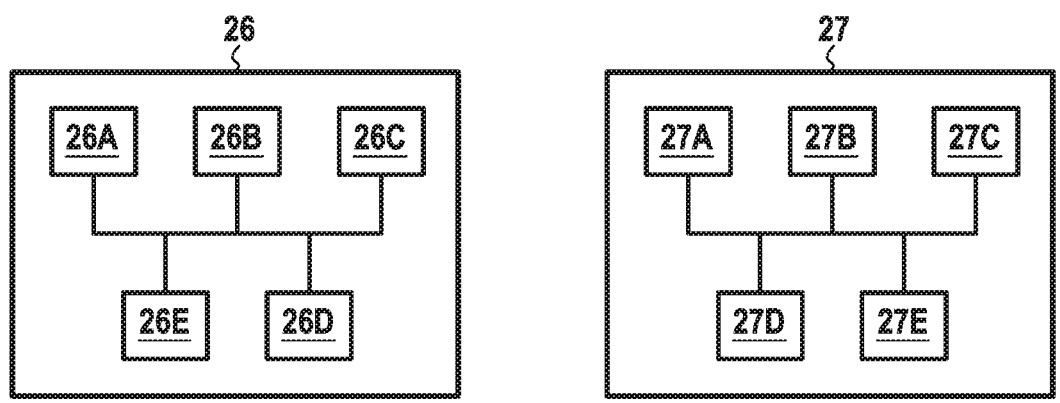
FIGS. 5A and 5B are diagrams showing the hardware architecture of a computer device implementing the control device and of a computer device implementing the connection server as shown in FIG. 4.

FIG. 5A is a diagram showing the hardware architecture of a computer device 26 implementing the control device 14. This computer device 26 comprises a processor 26A, a ROM 26B, a random access memory (RAM) 26C, a non-volatile memory 26D, and communication means 26E. The communication means 26E are suitable in particular for communicating:

with the base stations 13, with the switches 16, and with the interconnection gateways 15 using the OpenFlow™ protocol; and with the XMPP server 18, and via that server with the virtual functions 19 and 20 of the control plane by using the XMPP protocol.

The ROM 26B of the computer device 26 constitutes a data medium in accordance with the invention that is readable by the processor 26A and that stores a computer program in accordance with the invention including instructions for executing steps of a control method of the invention, which steps are described below with reference to FIGS. 6 and 7. In equivalent manner, the computer program defines the functional modules 14A, 14B, 14C, and 14D of the control device 14 as described above.

FIG. 5B is a diagram showing the hardware architecture of a computer device 27 implementing the XMPP server 18. This computer device 27 comprises a processor 27A, a ROM 27B, a RAM 27C, a non-volatile memory 27D, and communication means 27E. These communication means 27E are suitable in particular for communicating with the control device 14 and with the virtual functions 19 and 20 by using the XMPP protocol.

The ROM 27B of the computer device 27 constitutes a data medium in accordance with the invention that is readable by the processor 27A and that stores a computer program defining the functional modules 18A and 18B of the XMPP connection server 18 as described above.

The management performed by the core network 10 using the novel architecture proposed by the invention is described in greater detail below. This management is performed in the presently-described embodiment by relying on and by adapting the procedure for identifying a terminal as proposed by the LTE standard and the procedure for identifying a client entity by an XMPP server.

More specifically, it is assumed that each UE terminal 11 managed by the IP core network 10 has a unique temporary identifier, e.g. such as an identity of the globally unique temporary identity (GUTI) type as defined in the LTE standard. In known manner, this identity is used to avoid exposing and frequently exchanging over the radio link the permanent identity of the UE terminal 11, also known as the international mobile subscriber identity (IMSI).

The GUTI identity is constituted:

by a globally unique MME identity (GUMMEI) that designates in unique manner the MME entity that has allocated the GUTI identity of the UE terminal 11; and by an MME temporary mobile subscriber identity (M-TMSI) that uniquely identifies the UE terminal 11 within the MME entity.

The GUMMEI identity comprises:

an identifier of the public land mobile network (PLMN); and an MME identifier (MMEI), which is constituted by an MME group identifier (MMEGI) and an MME code (MMEC). The MME code constitutes a unique identifier of an MME entity (in this example the virtual function 20) within a group of MME entities, and the MMEGI identifier designates a group of MME entities from among different groups of MME entities.

In accordance with the invention, the MME entities presently considered are the above-described virtual MME functions 20 instantiated in the cloud computer system 17 and connected to the SDN control device 14 via the XMPP server 18. It is assumed that a plurality of virtual MME functions are thus instantiated in the cloud computer system 17 and are connected to the same control device 14.

When the UE terminal 11 seeks to communicate with the IP core network 10, it sends a request to the base station 13 serving it, which request contains the terminal's GUTI identity, if it has one. This request is transferred to the control device 14 for processing. The control device 14 then extracts the GUMMEI identity from the GUTI identity contained in the request and identifies the virtual MME function 20 allocated to the UE terminal 11. It updates its database 25 with the identifier of the virtual MME function 20 allocated of the UE terminal 11.

The control device 14 also searches whether an IP address has already been allocated to the UE terminal 11, and it identifies the virtual S/PGW-C function 19 that has been allocated thereto using the IP prefix, if it has one. It updates its database 25 with the identifier of the virtual S/PGW-C function 19 allocated to the UE terminal 11.

If the UE terminal 11 is not attached to the network and/or if it does not already have a GUTI identity allocated thereto (as applies in particular the first time the terminal connects to the core network, in which case the request from the terminal does not contain a GUTI but rather the IMSI identity of the terminal), the control device 14 selects and allocates a virtual MME function 20 for the terminal 11 from the set of virtual MME functions 20 instantiated in the cloud computer system 17. This allocation is performed on the basis of a current availability state and/or load state of the virtual MME functions 20 as transmitted by the XMPP server 18 or by a domain name server (DNS) (not shown in the figure). The virtual MME function 20-11 as selected in this way allocates a GUTI identity to the UE terminal 11, which identity contains the GUMMEI identity specifying the MME function.

In similar manner, a virtual S/PGW-C function 19-11 is selected and allocated on the basis of the same type of information for the UE terminal 11.

The databases 24 and 25 are updated by the management module 14D of the control device 14 in order to reflect the allocation of the virtual functions 19-11 and 20-11 to the UE terminal 11 and the allocation to this UE terminal 11 of a corresponding GUTI identifier (i.e. the control database 24 now identifies the terminal 11 (using its IMSI and GUTI identities) from among the terminals allocated to the virtual functions 19-11 and 20-11, and the user database 25 now identifies the virtual functions 19-11 and 20-11 using their Jabber addresses as allocated to the terminal 11).

As mentioned above, the management performed by the IP core network 10 likewise relies on and adapts the existing XMPP server procedures for identifying and authenticating a client entity.

In the cloud computer system 17, every virtual function, and more generally every entity connected to the XMPP server 18, is a client of the server identified by a unique Jabber address (Jabber ID). Such an address is itself known and it is configured by the XMPP server 18.

The XMPP server 18 then updates its client database 23 with this Jabber address and transmits it to the control device 14 in accordance with the invention. If new virtual functions are instantiated and connected to the XMPP server 18 (e.g. virtual S/PGW-C functions 19 and/or MME functions 20), the server updates its database 23 and transmits the Jabber addresses of these new functions to the control device 14 so as to enable it to communicate with them directly. It should be observed that although this communication is considered as being "direct" in the sense that the control device 14 directly uses the Jabber addresses of the virtual functions connected to the XMPP server 18, in order to communicate therewith, this communication is orchestrated by means of the XMPP server 18, i.e. it takes place through the XMPP server 18 which directs the communication towards the virtual function that is uniquely identified by the Jabber address supplied by the control device 14.

The XMPP server 18 gives the IP core network 10 access only to clients that are authorized and authenticated. When a new client, such as a new virtual S/PWG-C function 19 or MME function 20 is instantiated in the cloud computer system 17, the new client needs to be authenticated and configured by the XMPP server 18.

During this configuration, the client registers with the XMPP server 18 using its Jabber address. More precisely, it sends an XMPP IQ-get message to the XMPP server 18 in order to obtain the authentication fields necessary for authenticating it. On receiving the message, the XMPP server 18 sends an XMPP IQ-result message to the client containing the required authentication field. The client sends to the XMPP server 18 the information corresponding to the authentication fields in an XMPP IQ-get message; by way of example, this information comprises a user name and a password. The password may be transmitted as is or in the form of a cryptographic condensed version as obtained using the known secure hash algorithm SHA1.

On receiving the message from the client (authentication request), the XMPP server 18 creates an entry in its client database 23 and updates the information about the client in the database (Jabber address allocated by the cloud computer system operator, IP address, current availability and load state on the client). It sends an XMPP IQ-result message informing the client that authentication has been successful. By means of this message, the XMPP server 18 and the new client are configured and the server allocates resources to the client for future communication. Thereafter it keeps its client database 23 up to date, and in particular it updates the state of its client.

Figure 6A:
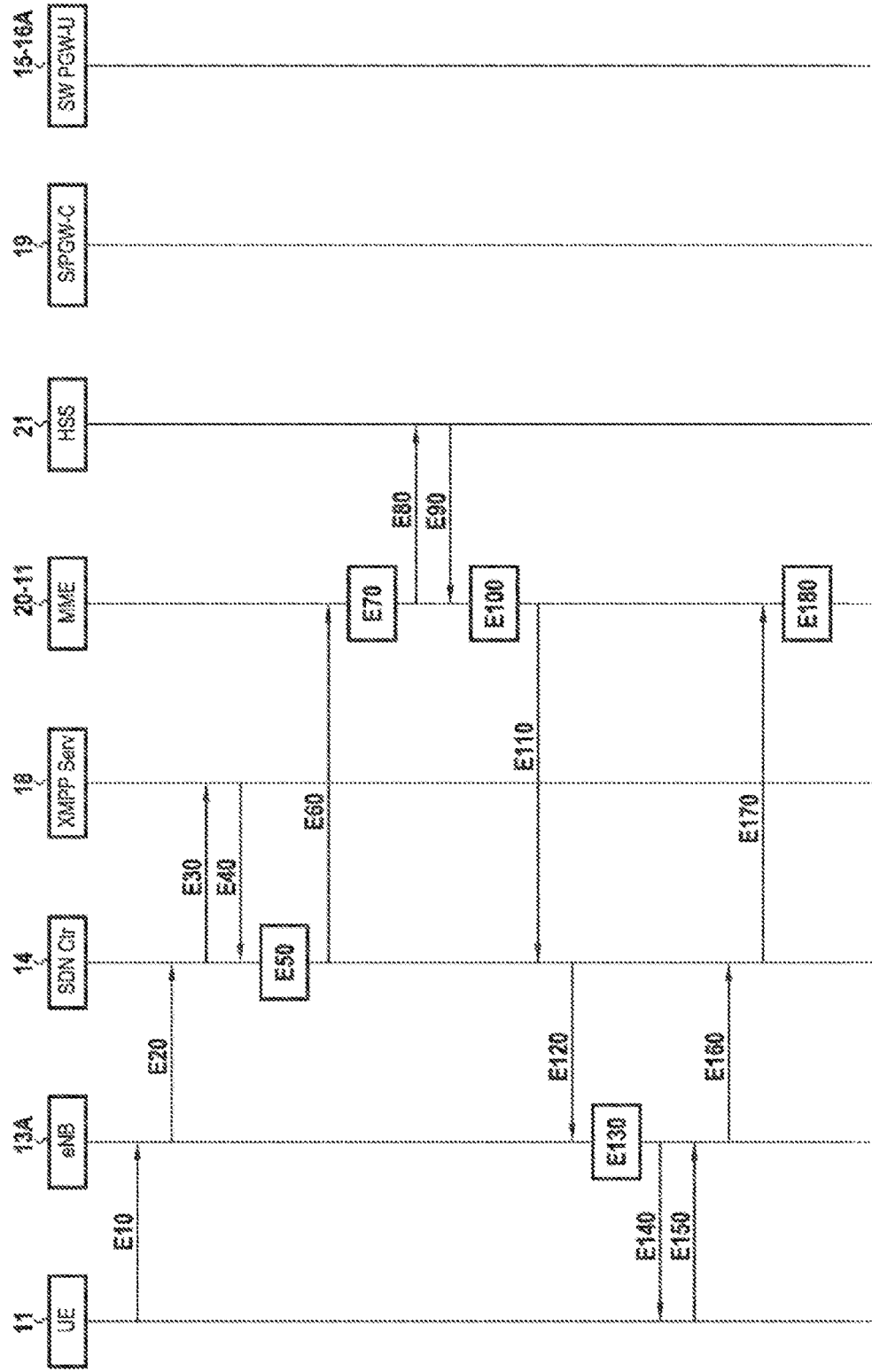
FIGS. 6 and 7 are diagrams respectively relating to two different contexts and sharing the main steps performed by the IP core network shown in FIG. 4 to establish a user plane enabling a terminal to transfer data, these steps resuming the main steps of a control method of the invention.
Figure 6B:
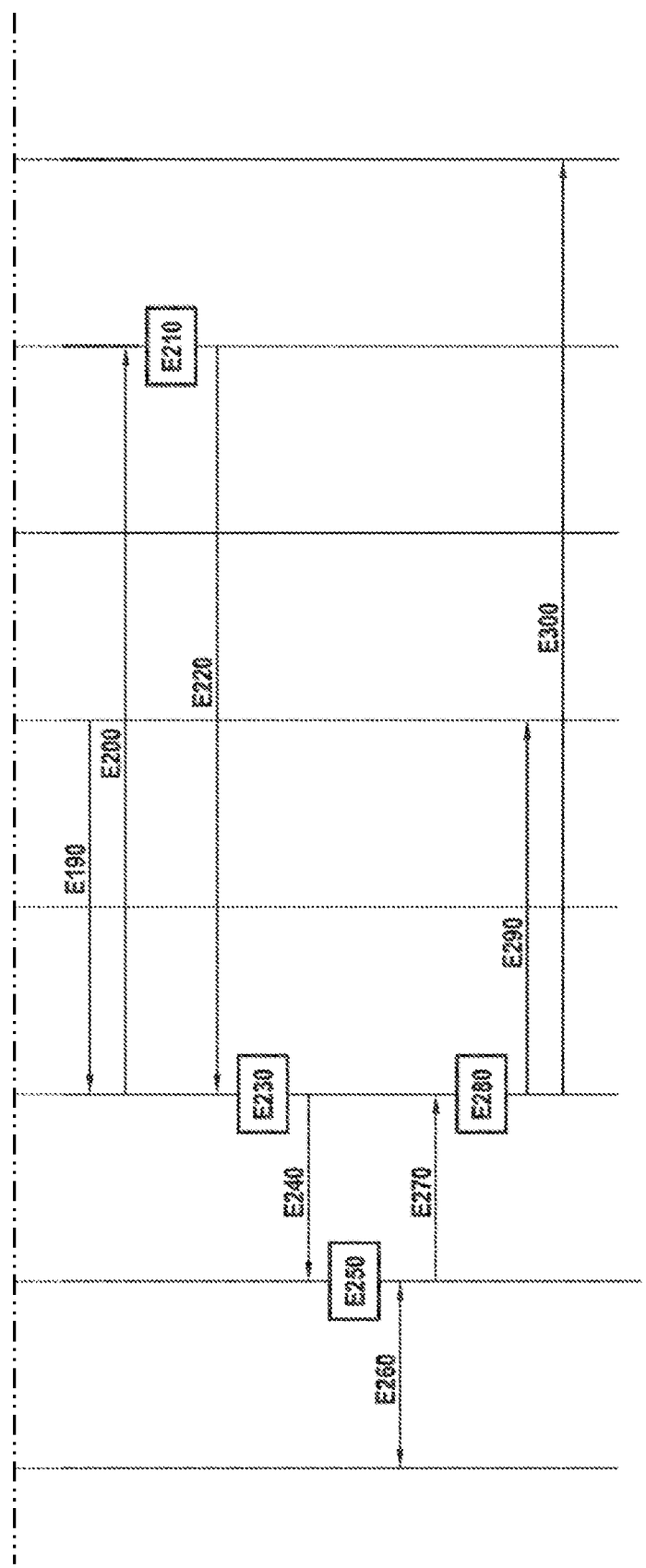
Figure 7:
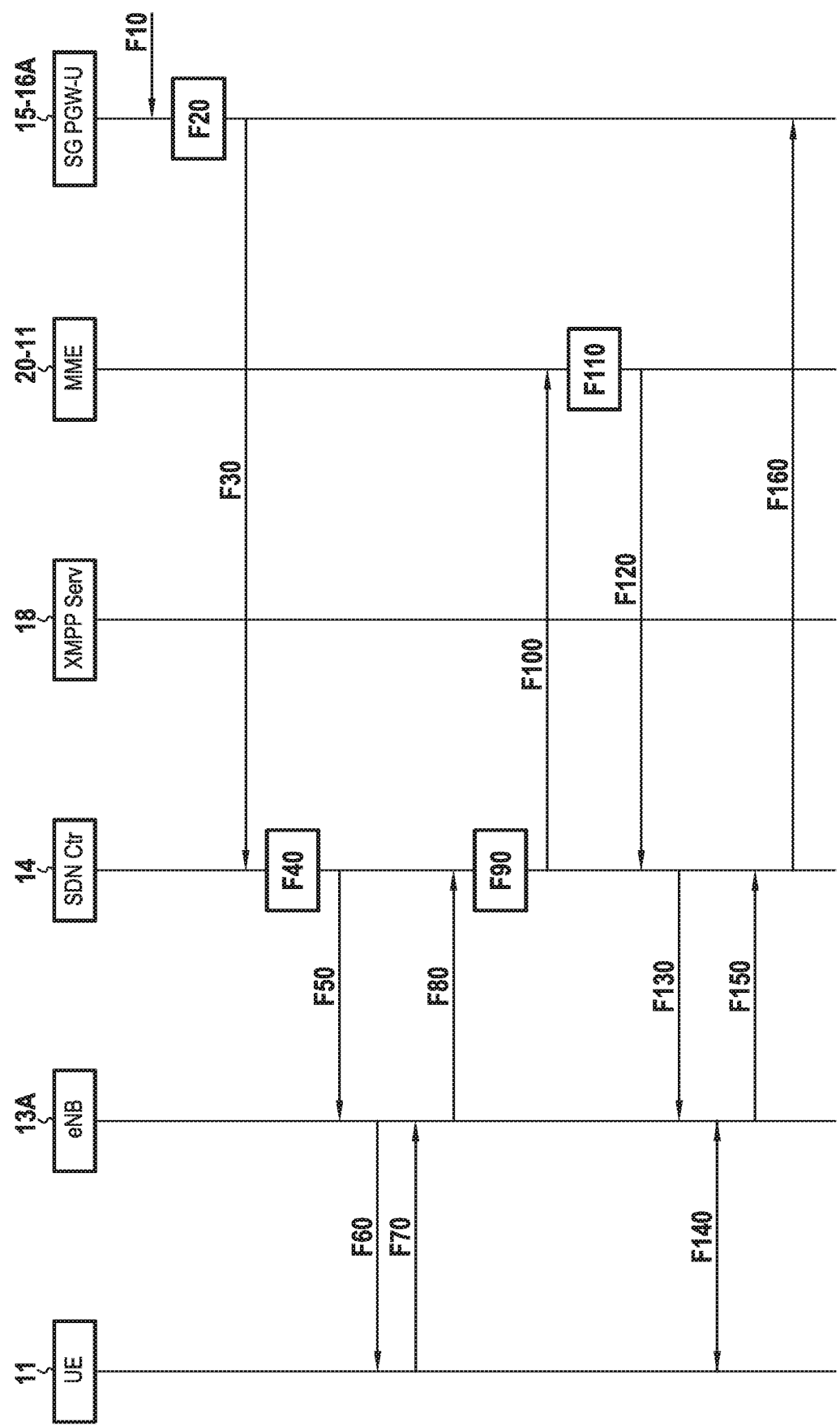

With reference to FIGS. 6 and 7, there follows a more detailed description of two procedures performed by the core network 10 while relying on the architecture.

FIG. 6, depicted in seperate figure subsections labeled as FIG. 6A and 6B, shows the main steps of a procedure for setting up a user plane between a base station 13A serving a UE terminal 11 of a user and an interconnection gateway 15 of the IP core network 10 connecting with an external PDN network 12 in order to enable the terminal to communicate (in other words to send or receive data).

Setting up a user plane consists in registering the UE terminal 11 with the IP core network 10 and in setting up a communication medium or "bearer" between the base station 13 and the interconnection gateway 15 so that it can send and receive IP data packets, thus having IP connectivity with the external packet data network (PDN) 12. Generally, this procedure is performed when the UE terminal 11 is switched on.

It is thus assumed that the terminal 11 sends, to the base station 13A from which it depends (i.e. generally the base station serving the cell in which the terminal is located), a request for attachment to the core network 10 (step E10). This request comprises a request for connectivity to the external PDN network 12 and the identities of the UE terminal 11, in particular its permanent IMSI identity and, if it has one, its temporary GUTI identity.

The base station 13A encapsulates this request in a PACKET_IN message in compliance with the OpenFlow™ protocol and it sends it to the control device 14 (step E20). In this message, the base station 13A also includes an identifier of the UE terminal 11, written eNB_OF_UE11_ID, that is used for uniquely identifying the UE terminal 11 between the base station 13A and the control device 14. By way of example, this identifier is similar to the S1-AP UE identifier used in the 3GPP standard.

On receiving the PACKET_IN message, the control device 14 extracts from the request of the UE terminal 11 its identifier IMSI and its GUTI, if it has one, and then consults the user database 25 on the basis of the identifier(s).

It is assumed at this point that no entry corresponding to the UE terminal 11 (IMSI or GUTI) exists in the database 25.

The control device 14 then uses its communication module 14B to send an IQ-get request in compliance with the XMPP protocol to the XMPP server 18 (step E30).

The XMPP server 18 consults its client database 23 and responds to the request by transmitting to the control device 14 the available virtual MME functions 20 that are instantiated in the cloud computer system 17 (i.e. identifiers for these functions such as their Jabber addresses), together with their current load states (step E40).

The control device 14 then creates an entry in its user database 25 for the UE terminal 11, and it associates the IMSI of the UE terminal 11 with that entry.

It also uses its control modules 14C to select, from the available virtual MME functions 20, a virtual MME function referenced 20-11 for the UE terminal 11, with this selection being a function in particular of the current loads of the MME functions and possibly of other parameters, such as for example the geographical location of the terminal.

The control device 14 allocates the virtual MME function 20-11 as selected in this way to the UE terminal 11, and uses its database management module 14D to update the database 25 with the Jabber address of the virtual MME function 20-11 (step E50). It also updates the database 24 by associating the IMSI identity of the UE terminal 11 with the virtual MME function 20-11.

Thereafter, the control device 14 uses its communication module 14B to send an XMPP IQ-get request directly to the virtual MME function 20-11 (step E60). This request uses the Jabber address of the virtual MME function 20-11 and passes via the XMPP server 18 in known manner, as mentioned above. This request contains all of the conventional attachment parameters for attaching a terminal to a core network, such as in particular the IMSI and GUTI identities of the terminal, etc., together with the Jabber address of the control device 14.

On receiving this request, the virtual MME function 20-11 allocated to the UE terminal 11 verifies whether the UE terminal 11 is identified in its database (step E70).

It is assumed at this point that the UE terminal 11 is not identified in the database of the virtual MME function 20-11.

The virtual MME function 20-11 then sends to the HSS server function 21 an authentication message based on the IMSI identity of the UE terminal 11 in order to obtain the identities and authentication parameters as allocated to the UE terminal 11 by the IP core network 10 (e.g. GUTI, IP address, base station to which the terminal is attached, integrity protection and encryption keys for the non-access stratum (NAS) network layer for communication between the UE terminal and the MME entity in the LTE model, etc.) (step E80). It should be recalled that the virtual MME function 20-11 and the virtual HSS function 21 in this example communicate with each other using the S6a interface as defined in the LTE standard.

The virtual HSS function 21 derives the identities and the authentication parameters of the UE terminal 11 and transmits them to the virtual MME function 20-11 in a response message (step E90).

In known manner, the virtual MME function 20-1 extracts from the response message authentication parameters and identities of the UE terminal 11 and stores them in its database (step E100).

The NAS keys are then sent in an XMPP IQ-result response message to the control device 14 (step E110). This message also includes a request for authenticating the terminal UE 11.

The control device 14 acts via its communication module 14A to transmit the authentication request to the base station 13A (step E120). This request is encapsulated in an OpenFlow™ PACKET_OUT message and contains an identifier CONT_OF_UE11_ID uniquely identifying the UE terminal 11 on the interface between the base station 13A and the control device 14, together with the identifier eNB_OF_UE11_ID.

The base station 13A identifies the UE terminal 11 from the identifier eNB_OF_UE11_ID and updates its user database with the identifier CONT_OF_UE11_ID (step E130).

It should be observed that the identifiers eNB_OF_UE11_ID and CONT_OF_UE11_ID advantageously make it possible to use the same interface between the base station 13A and the control device 14 for the plurality of UE terminals being served by the base station, the control device 14 itself being connected to a plurality of base stations. These identifiers enable the control device 14 to distinguish between messages coming from and going to a specific base station, and/or coming from a given UE terminal. Likewise, they enable a base station to distinguish easily between the terminals.

Thereafter, the base station 13A extracts the authentication request coming from the MME function 20-11 contained in the PACKET_OUT message and relays it to the UE terminal 11 (step E140).

The UE terminal 11 transmits its response to the authentication request to the base station 13A (step E150).

This response is relayed by the base station 13A to the control device 14, being encapsulated in an OpenFlow™ PACKET_IN message (step E160).

The control device 14 uses its communication module 14B to relay in turn the response from the UE terminal 11 to the virtual MME function 20-11 in an XMPP IQ-set message (step E170).

On receiving the IQ-set message, the virtual MME function 20-11 compares the information supplied by the UE terminal 11 (e.g. NAS keys) with the authentication parameters transmitted by the virtual HSS function 21 during step E90 (step E180).

If the parameters match, the virtual MME function 20-11 authenticates the UE terminal 11. Otherwise, it rejects the request from the terminal.

It is assumed at this point that the parameters match, in other words that the UE terminal 11 is successfully authenticated. The virtual MME function 20-11 then sends an XMPP IQ-result message to the control device 14 in order to set up a user plane for the terminal (step E190).

The control device 14 then uses the XMPP server 18 to send an XMPP IQ-get message to the virtual S/PGW-C function 19 that is allocated to the UE terminal 11 as stored in its user database 25, as mentioned above, in order to set up a GTP communication tunnel for the communication sessions of the UE terminal (step E200). The virtual S/PGW-C function 19 allocated to the UE terminal 11 is referred to subsequently by the reference 19-11.

The virtual S/PGW-C function 19-11 selects a switch 16A and an interconnection gateway 15 for the user plane on the basis of load information concerning those pieces of network equipment (step E210). By way of example, this load information is obtained by using the Gx interface between the virtual S/PGW-C function 19-11 and the virtual PCRF function 22. It also creates communication parameters identifying a communication tunnel between the base station 13A and the gateway 15 for uplink communications of the UE terminal 11. These communication parameters include in particular a tunnel endpoint identifier (TEID).

Furthermore, the virtual S/PGW-C function 19-11 extracts the IP address of the terminal from a dynamic host configuration protocol (DHCP) server (not shown) and the quality of service of the communication medium (bearer) by using the Gx interface to interrogate the virtual PCRF function 22. The DHCP server may be implemented by using a virtual function instantiated in the cloud computer system 7 or it may be integrated in a virtual S/PGW-C function that has already been instantiated.

The virtual S/PGW-C function 19-11 transmits an XMPP IQ-result response message to the control device 14 that includes the TEID identifier allocated by the virtual S/PGW-C function 19-11, the IP addresses of the switch 16A and of the interconnection gateway 15, the IP address of the UE terminal 11, and the quality of service of the communication medium (step E220).

The control device 14 uses its database management module 14D to update the user database 25 with the IP addresses of the switch 16A and of the interconnection gateway 15, the IP address of the UE terminal 11, and the communication tunnel TEID identifier allocated by the virtual S/PGW-C 19-11 function (step E230).

Thereafter, it sends an OpenFlow™ PACKET_OUT message to the base station 13A accepting the attachment request from the UE terminal 11 and for setting up the communication medium (step E240). This message contains the IP addresses of the switch 16A and of the interconnection gateway 15, together with the TEID identifier, as stored in the user database 25. This message contains a processing rule in the meaning of the invention for controlling the base station 13A while transferring data destined for the UE terminal 11.

On receiving the PACKET_OUT message, the base station 13A updates its flow table with the processing rule contained in the message, in other words with the IP addresses of the switch 16A and of the interconnection gateway 15, and the tunnel identifier (TEID) (step E250). These parameters define a single communication tunnel between the base station 13A and the interconnection gateway 15 for transferring uplink data.

The base station 13A then sets up a radio resource control (RRC) connection with the UE terminal 11 (step E260).

Thereafter it creates a downlink tunnel endpoint identifier and sends it to the control device 14 using the OpenFlow™ protocol (step E270).

The control device 14 updates the communication parameters allocated to the UE terminal 11 in its user database 25 (step E280).

It sends these parameters to the virtual MME function 20-11 in an XMPP IQ-set message (step E290).

Furthermore, it uses its command module 14A to control the switch 16A and the gateway 15 by sending them an OpenFlow™ PACKET_OUT message containing the processing rules for data streams relating to the UE terminal 11 (step E300). For example, one such rule may be to route the data streams destined for the UE terminal 11 to the base station 13A. The switch 16A and the gateway 15 update their flow tables on the basis of these processing rules.

This step finishes off setting up the user plane for the communications of the UE terminal 11.

With reference to FIG. 7, there follows a description of the main steps of a procedure for processing a service request at the initiative of the core network 10 and destined to a UE terminal 11 that may be in a non-active or "idle" state for which data has been received by the core network (step F10). This procedure comprises setting up a user plane enabling the UE terminal 11 to receive downlink data.

It is thus assumed that a data stream destined for the UE terminal 11 has been received by the IP core network 10 coming from the external PDN network 12 via the interconnection gateway 15 (step F10).

In architectures of SDN type, the flow tables maintained by the pieces of network equipment are generally of limited size in order to optimize the memory space of such pieces of equipment. The entries in these flow tables are therefore of limited lifetime: when a UE terminal 11 has not been using a network service for a determined period of time, the core network 10 discards the information about the UE terminal 11 in the user plane and in the base station 13A that serves it. In other words, the core network deletes the processing rules relating to data destined for the UE terminal 11 and stored in the flow tables maintained by the switch 16A, the interconnection gateway 15, and the base station 13A.

Thus, during this period of inactivity, when the UE terminal 11 receives downlink data coming from the external PDN network 12 and when the interconnection gateway 15 connected to the external PDN network 12 interrogates its flow table in order to determine the piece of network equipment to which it is to transfer the data, it does not find any processing rule for application to this data (step F20).

The interconnection gateway 15 thus sends a request to the control device 14 in an OpenFlow™ PACKET_IN message in which it is inserts the header of the IP packet it has received for the UE terminal 11 (step F30).

On receiving this message, the control device 14 uses its database management module 14D to obtain the parameters of the UE terminal 11 by interrogating its user database 25 (step F40). These parameters include in particular the parameters of the search list, also known as the "tracking area list" (TAL), and the GUTI identity of the UE terminal 11.

Thereafter it sends a paging message to the base stations 13 identified in the search list using a known procedure that is implemented by the corresponding control module 14C (step F50). This search list includes in particular the base station 13A serving the cell in which the UE terminal 11 is to be found.

The base station 13A transmits the paging message to the UE terminal 11 (step F60).

On receiving this message, the UE terminal 11 passes into an active state and sends a service request message to the base station 13A, which message includes its own NAS network layer keys (step F70).

The base station 13A relays this message in an OpenFlow™ message to the control device 14 (step F80).

The control device 14 updates its user database 25 with the identifier of the base station 13A (step F90) and sends, in an XMPP IQ-get message, the NAS key to the virtual MME function 20-11 for managing mobility that is allocated to the UE terminal 11 according to its user database 25 (step F100).

The virtual MME function 20-11 verifies whether the key supplied by the UE terminal 11 corresponds to the key supplied by the virtual HSS server function 21 as stored in its database in association with the UE terminal 11 (step F110).

It sends the result of this authentication to the control device 14 in an XMPP IQ-result message (step F120).

If the result is positive (i.e. if the UE terminal 11 is authenticated by the MME function 20-11), the control device 14 requests from the base station 13A a downlink communication tunnel identifier (TEID) for the UE terminal 11 (step F130).

The base station 13A sets up an RRC connection with the UE terminal 11 (step F140).

It sends the requested TEID tunnel identifier to the control device 14 in an OpenFlow™ message (step F150).

The control device 14 updates the user database 25 with this tunnel identifier and transmits it in an OpenFlow™ PACKET_OUT message to the switch 16A and the gateway 15 in the form of processing rules (step F160).

This control of the switch 16A and the gateway 15 by the control device 14 enables the data streams destined for the UE terminal 11 to be routed appropriately in the network.

In the two above-described example procedures, a user plane is set up to enable a terminal to communicate with an external packet data network. The architecture proposed by the invention also makes it possible to maintain and update the user plane in the event of a malfunction (e.g. failure or overload) of a piece of network equipment in the user plane or of a control function instantiated in the cloud computer system 17. Thus, in particular if a virtual MME function 20-11 allocated to the UE terminal 11 is overloaded, the control device 14 is informed by means of the XMPP server 18 and can act appropriately after updating its control database 24.

In particular, it can select a new virtual MME function 20 instantiated in the cloud computer system 17, or it can request instantiation of a new virtual MME function 20 in the cloud computer system 17, or indeed it can balance traffic between the virtual mobility management entity (MME) functions 20 that have already been instantiated.

In such a situation the action of the XMPP server 18 may be:

reactive, informing the control device 14 of the current state of overload of the mobility management function 20-11 allocated to the UE terminal 11 so that the control device 14 can envisage appropriate action; or proactive, by supplying the control device 14 with a list of MME functions 20 that are available in the cloud computer system 17 so that the control device 14 selects a function from among the available functions and allocates it to the UE terminal 11.

After this allocation, the control device 14 updates its databases 24 and 25 in corresponding manner.

The invention claimed is:

1. A control device of an IP core network configured to control a base station of an access network, a switch of the IP core network, and an interconnection gateway connecting the IP core network to an external packet data network, the control device configured to:
communicate, via a connection server, with a plurality of virtual functions of a control plane of the IP core, the control device registered as a client with the connection server, the plurality of virtual functions instantiated in a cloud computer system and registered as clients with the connection server;
manage:
a first database identifying for at least one user terminal managed by the IP core network and served by the base station at least one of the virtual functions allocated to the terminal, and
a second database associating at least one of the virtual functions with an identifier of the virtual function at the connection server and with a state of the virtual function;
update the first and second database on the basis of information received from the connection server and/or from the virtual functions; and
use data of the first and second database to set up and maintain, for a terminal managed by the IP core network, a user plane between the base station, the switch, and the interconnection gateway.

2. A control device according to claim 1, wherein the connection server is a server having the control device and the virtual functions as clients, the control device being configured to communicate with the connection server and the virtual functions by using the XMPP communication protocol.

3. A control device according to claim 1, wherein the virtual functions of the control plane instantiated in the cloud computer system comprise:
at least one function for managing the mobility of terminals in the IP core network; and
at least one function for controlling said interconnection gateway and/or said switch.

4. A control device according to claim 1, wherein the control device is further configured to allocate to the terminal managed by the IP core network at least one said virtual function instantiated in the cloud computer system as a function of information representative of a current availability state and/or a current load state of the virtual function, as transmitted by the connection server.

5. A control device according to claim 1, wherein the first database further includes, for the terminal, at least one communication parameter for use in transferring data in the user plane set up by the control device.

6. A control device according to claim 5, wherein said at least one communication parameter comprises an address of the interconnection gateway, an address of the switch, and identifiers of endpoints of a communication tunnel set up in the user plane.

7. A control device according to claim 1, wherein the control device is configured to utilize the connection server as an intermediary device in exchanging communication with the plurality of virtual functions of the control plane of the IP core.

8. A control device according to claim 1, wherein the control device is configured to communicate, via the connection server, with the plurality of virtual functions of the control plane of the IP core by sending a request to the control device, the request configured to cause the connection server to send a response to at least one of the plurality of virtual functions of the control plane of the IP core.

9. An IP core network comprising:
a control device for controlling a base station of an access network, a switch of the IP core network, and interconnection gateway for connecting the IP core network to an external data packet network;
a cloud computer system having instantiated therein at least one virtual function of a control plane of the IP core network; and
a connection server, wherein the connection server is configured to register the control device and the at least one virtual function as clients of the connection server, and to manage a database associating at least one client of the connection server with a unique connection server identifier and with a client state, and wherein the control device is configured to:
transmit to the connection server a request for allocation of a virtual function to a user terminal;
receive from the connection server information extracted from the database relating to the at least one virtual function registered as a client with the connection server; and
use data of the database the received information to set up and maintain, for the user terminal, a user plane between the base station, the switch, and the interconnection gateway.

10. The IP core network of claim 9, wherein the connection server is further configured to communicate with said at least one virtual function and the control device make use of the XMPP communication protocol.

11. The IP core network of claim 9, wherein the connection server is further configured to transmit to the control device information representative of a current availability state and/or a current load state of at least one said virtual function identified in the database.

12. A control method for controlling an IP core network, the method implemented by a control device, the method comprising:
communicating, via a connection server, with a plurality of virtual functions of a control plane of the IP core, the control device registered as a client with the connection server, the plurality of virtual functions instantiated in a cloud computer system and registered as clients with the connection server;
managing:
a first database identifying for at least one user terminal managed by the IP core network and served by the base station at least one of the virtual functions allocated to the user terminal; and
a second database associating at least one of the virtual functions with an identifier of the virtual function at the connection server and with a state of the virtual function;
updating the first and second database on the basis of information received from the connection server and/or from the virtual functions; and
setting up and maintaining, for a terminal managed by the IP core network, a user plane between a base station of an access network serving the terminal, a switch of the IP core network, and an interconnection gateway of the IP core network for connection to an external packet data network by using data from the first and second database.

13. A control method according to claim 12, further comprising controlling the base station and/or the switch and/or the interconnection gateway, the controlling comprising transmitting to the base station and/or to the switch and/or to the interconnection gateway at least one processing rule for processing a data stream relating to the terminal, said at least one processing rule being defined on the basis of the data from the first and/or second databases and being for application while transferring data in the user plane.

14. A control method according to claim 12, further comprising allocating one of said virtual functions of the control plane to the terminal as a function of information representative of a current availability state and/or a current load state of said function as transmitted by the connection server.

15. A non-transitory computer readable data medium having stored thereon instructions which for executing steps of the control when executed by a processor, cause the processor to perform a control method for controlling an IP core network, the method comprising:

communicating, via a connection server as a client of the connection server, with a plurality of virtual functions of a control plane of the IP core, the plurality of virtual functions instantiated in a cloud computer system and registered as clients with the connection server;

managing:
  a first database identifying for at least one user terminal managed by the IP core network and served by the base station at least one of the virtual functions allocated to the user terminal; and
  a second database associating at least one of the virtual functions with an identifier of the virtual function at the connection server and with a state of the virtual function;

updating the first and/or second database on the basis of information received from the connection server and/or from the virtual functions; and setting up and maintaining, for a terminal managed by the IP core network, a user plane between a base station of an access network serving the terminal, a switch of the IP core network, and an interconnection gateway of the IP core network for connection to an external packet data network by using data from the first and second database.

* * * * *